Figure 1:
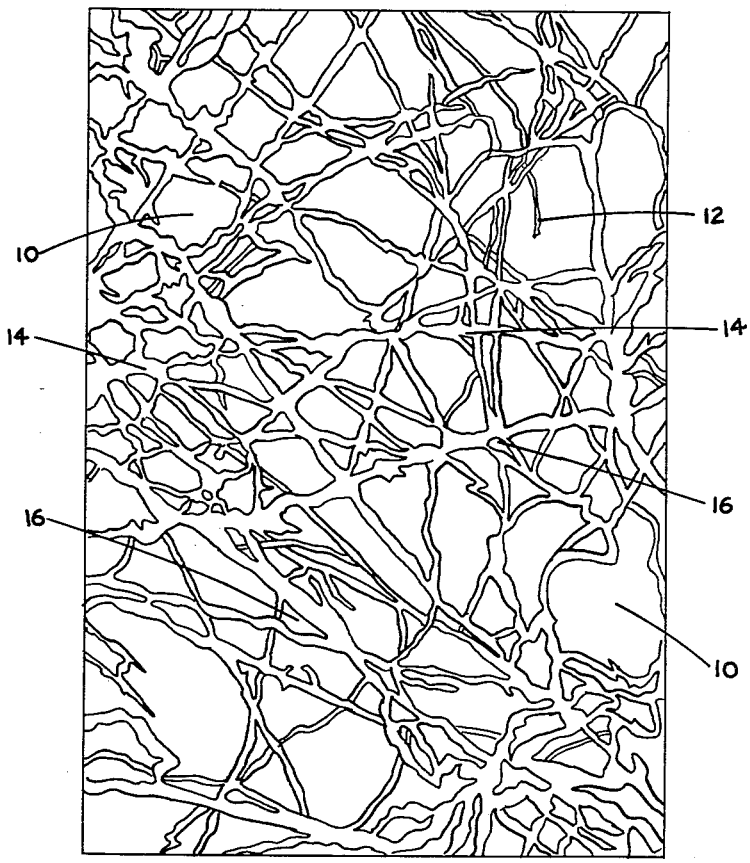

June 19, 1962     T. F. BANIGAN, JR., ET AL     3,039,893
SURGICAL ADHESIVE TAPE HAVING A RETICULATE
WEB PATTERN OF ADHESIVE FORMED BY
MONOFILAMENTS OF ADHESIVE
Filed April 23, 1959

INVENTORS
THOMAS F. BANIGAN, JR.
PAUL A. PLASSE

By *Bessie A. Lepper*
Attorney

United States Patent Office 3,039,893
Patented June 19, 1962

3,039,893
SURGICAL ADHESIVE TAPE HAVING A RETICULATE WEB PATTERN OF ADHESIVE FORMED BY MONOFILAMENTS OF ADHESIVE
Thomas F. Banigan, Jr., Walnut Creek, Calif., and Paul A. Plasse, Lexington, Mass., assignors to Arthur D. Little, Inc., Cambridge, Mass., a corporation of Massachusetts
Filed Apr. 23, 1959, Ser. No. 808,454
6 Claims. (Cl. 117—122)

This invention relates to an improved adhesive tape and more particularly to an adhesive tape which is porous.

Many types of adhesive tapes for medicinal or surgical use have been developed in the past. Attempts have been made to render these tapes at least partially porous by perforating the backing or substrate material or by spreading the adhesive in a pattern which leaves small perforations in an otherwise continuous adhesive layer.

It has been well known for many years that surgical adhesive tape can have extremely irritating effects upon the skin. It is believed that the primary reason for the various types of irritations experienced is the inability of the tape to "breathe." As is known, one of the most important metabolic functions of the skin is to excrete a portion of the body's water loss. A tape which is not porous interferes with this body function and if it is used to cover a substantial area, the end result may well be a number of different types of irritations.

It would, therefore, be desirable to have available an adhesive tape which was truly porous and which at the same time gave marked increase in ventilation, and hence provided for moisture absorption or escape and thus materially lessened the cause and occurrence of skin irritation brought about through tape application.

It is, therefore, the primary object of this invention to provide a novel type adhesive tape which is essentially porous and which, therefore, provides a means for materially decreasing or even eliminating possible irritations associated with the use of surgical tape. It is another object of this invention to provide an adhesive surgical tape, the adhesive quality of which may be varied depending upon the use to which it is put. It is yet another object to provide a new form of a pressure-sensitive adhesive. These and other objects will become apparent in the following description of this invention.

Briefly the adhesive tape of this invention comprises an air-permeable backing on one surface of which is deposited a pressure-sensitive adhesive in the form of monofilaments randomly placed in network fashion to form a reticulate web of adhesive with interstices between the monofilaments, the area of the surface of the backing or substrate corresponding to the interstices between the monofilaments comprising a relatively large portion of the total area of the surface or substrate.

By depositing the adhesive on the surface or substrate in the form of monofilaments laid in network fashion, it is possible to obtain maximum adhesion using a minimum amount of adhesive while at the same time providing sufficient areas of the porous substrate free from adhesive to form an essentially porous adhesive tape. Thus, there is achieved less adhesive contact with the skin and a more truly overall porosity of the tape without any material sacrifice in adhering quality. Moreover there is no need to perforate either the backing material or the adhesive layer, and when lengths of the adhesive tape are cut, the random network nature of the adhesive means that good bonding at the edges will always be achieved.

The adhesive tape of this invention is illustrated in FIG. 1 in which the size of the monofilaments and the pore size of the porous backing are exaggerated for ease of illustration.

In FIG. 1 a porous backing 10 is covered on one surface with a randomly placed network of monofilaments of adhesive 12 to form a reticulate web generally illustrated as 14 having between the monofilaments a multitude of interstices 16 which permit the exposure of the backing material 10. We have found that the amount of backing material which may thus be exposed by reason of the interstices lying between the monofilaments may account for as much as 75% of the total area of the backing material using known adhesives. This may, of course, be increased to about 80% if a better adhering adhesive, compatible with the skin, is employed. A lower range of exposed surface area is about 25%, whereas a preferred range is from about 50 to 65%. However, the amount of adhesive deposited in network fashion will depend upon the use for which the adhesive is intended. Thus, for example, where large quantities of an adhesive tape are to be used for a therapeutic application (support for a strain, for example) the lower quantity of adhesive, i.e., exposed surface of the backing in the order of 75%, may be used. We have found that where the pull on the adhesive is exerted in a plane essentially parallel to that of the adhesive plane, only a small quantity of adhesive is required. On the other hand, where the adhesive deposited in accordance with this invention is to be applied to a ready-made type bandage, for example, it will be advantageous to decrease the porosity of the tape by the use of a larger quantity of adhesive since the pull exerted on the tape may not always be in the plane of the adhesive coated surface.

The monofilaments of adhesive deposited on the backing or substrate may range in diameter from about one-half to five mils, with a preferred range being from about one-half to two. This means that the overall thickness of the adhesive film applied will range from about one-half to four to five mils since it is desirable to keep the thickness equivalent to about the diameter of one monofilament. That is, it is desirable not to have the monofilaments crisscross and pile up over each other an more than necessary.

The backing material or substrate may be any woven or non-woven material which is porous in itself. Many such materials are known in the art and used in the making of adhesive tapes. It may, of course, be desirable to use a material which is highly moisture or water-absorbent but the backing of this invention is not limited to such a material. Other backing materials may include, but are not limited to, perforated films whether or not transparent, perforated rubber or elastic films, elastic materials or Holland cloth. It should be pointed out that the network type adhesive of this invention is particularly well adapted to the use of an elastic backing material since the network structure of the adhesive gives it an inherent elastic or stretchable quality compatible with the elasticity of the backing. The network type adhesive of this invention may be coated on an elastic type bandage used primarily as a support to achieve additional anchoring of such a bandage.

The adhesive deposited in accordance with this invention may be any pressure-senstive type adhesive known in the art of adhesive tape manufacture. For example, a typical adhesive suitable for the practice of this invention is described in U.S. Patent 2,647,100. Generally, the preferred adhesive will be a rubber-base adhesive such as illustrated in the examples. These are known to be compatible with normal type skin.

In the preparation of the adhesive, usually in the form of a solution or dispersion, care of course should be taken that the adhesive solids are sufficiently comminuted to permit spraying or otherwise depositing the adhesive in the required fine monofilament form. Thus, the adhesive should possess suitable physical characteristics to permit its being laid in monofilament form to form the reticulate web required in the practice of this invention.

Many techniques are known in the art for the deposition of the reticulate web of monofilaments required in this invention. Thus, fine fibers may be extruded from a solution and air blown against the backing. Another method would be to deposit the fibers from a multiple head jig in an erratic pattern. The fibers may also be spun individually and laid in random fashion to achieve the degree of porosity required.

This invention may be further described with reference to the following examples which are meant to be illustrative and not limiting.

*Example I*

A pressure-sensitive adhesive was formulated by incorporating 60 grams of a natural pale crepe rubber, 40 grams of polyisobutylene (sold as Vistanex L–140 by Enjay Company, Inc.), 30 grams of a resinous tackifier (sold as Piccolyte S–100 by Pennsylvania Industrial Chemical Corp.) and 40 grams of hard clay in 560 grams of a mixture of three parts of a rubber solvent and seven parts of a textile spirit solvent. Both the rubber solvent and textile spirit solvents were predominantly aliphatic in nature, the former having a boiling range from about 150 to 172° F., the latter from 105 to 270° F. The aniline points were 133 and 137° F., respectively. (These solvents are sold under the trade name Amsco by the American Mineral Spirits Company.)

This adhesive solution was then forced through a 17-gage needle while air at the rate of 9 cubic feet per minute was blown against the extruded fibers as they were directed toward the backing which was a porous cotton gauze. The monofilaments of adhesive adhered well to the backing, they had an average diameter of from 0.5 to 1 mil and there was a good tack when the material was adhered to the back of the hand. The area of the backing corresponding to the interstices in the network of the reticulate web amounted to about 60% of the total area of the backing. Wearing of the adhesive tape for several hours resulted in no undue moisture accumulation under the tape as is associated with standard surgical adhesive tape.

*Example II*

A pressure-sensitive adhesive was formulated by incorporating 98 grams of natural pale crepe rubber, 52 grams of polyisobutylene (sold as Vistanex L–140 by Enjay Company, Inc.), 75 grams of a resinous tackifier (sold as Piccolyte S–100 by Pennsylvania Chemical Corp.) and 75 grams of zinc oxide in 1000 grams of the solvent used in Example I. The adhesive solution had a viscosity of 3,000 centiposes and it was extruded through a combination of 17- and 23-gage needles with the use of an air stream at the rate of 5 cubic feet per minute onto a porous elastic backing such as used to form elastic bandages. The resulting reticulate web of adhesive consisted of mixed sizes of monofilament fibers ranging from about one-half to 5 mils in diameter. The amount of porous backing which remained uncoated by the adhesive was about 75% of the total surface area. The resulting adhesive exhibited good tack and gave the feel of a porous material. Moreover, the elastic backing lost none of its original elasticity.

The adhesive tape of this invention provides a surgical tape which is essentially porous in nature and thus offers the possibility of lessening or even eliminating the irritations associated with extensive contact of adhesive tapes with the skin. Moreover, the adhesive tape of this invention affords a flexibility both with respect to adhering qualities and degree of porosity.

We claim:

1. A surgical adhesive tape comprising an air-permeable backing on one surface of which is deposited a pressure-sensitive adhesive in the form of monofilaments randomly placed in network fashion to form a reticulate web with interstices between said monofilaments, the area of the surface of said backing corresponding to said interstices ranging between about 25 and about 75% of the total area of said surface, whereby said surgical adhesive tape is porous and breathable and permits ventilation of the skin area to which it is applied.

2. Surgical adhesive tape in accordance with claim 1 wherein said air-permeable backing is a water absorbing material.

3. Surgical adhesive tape in accordance with claim 1 wherein said air-permeable backing is a perforated film.

4. Surgical adhesive tape in accordance with claim 1 wherein said air-permeable backing is an elastic material.

5. Surgical adhesive tape in accordance with claim 1 wherein said pressure-sensitive adhesive is a rubber-base adhesive.

6. Surgical adhesive tape in accordance with claim 1 wherein the diameter of said monofilaments ranges from about one half to about 5 mils.

References Cited in the file of this patent

UNITED STATES PATENTS

| | | |
|---|---|---|
| 2,391,515 | Richards et al. | Dec. 25, 1945 |
| 2,510,120 | Leander | June 6, 1950 |
| 2,592,801 | Hanington | Apr. 15, 1952 |
| 2,741,564 | Mahler | Apr. 10, 1956 |
| 2,940,868 | Patchell | June 14, 1960 |

FOREIGN PATENTS

| | | |
|---|---|---|
| 206,680 | Australia | May 12, 1955 |